(12) United States Patent
Kim et al.

(10) Patent No.: US 8,184,243 B2
(45) Date of Patent: May 22, 2012

(54) LIQUID CRYSTAL DISPLAY AND MANUFACTURING METHOD THEREOF

(75) Inventors: Jin-Seuk Kim, Daejeon (KR); Byoung-Joo Kim, Anyang-si (KR); Yui-Ku Lee, Suwon-si (KR); Chang-Soon Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 494 days.

(21) Appl. No.: 12/409,376

(22) Filed: Mar. 23, 2009

(65) Prior Publication Data
US 2010/0085515 A1    Apr. 8, 2010

(30) Foreign Application Priority Data
Oct. 6, 2008    (KR) ................. 10-2008-0097653

(51) Int. Cl.
G02F 1/1335    (2006.01)
G02F 1/1339    (2006.01)
(52) U.S. Cl. ........................... 349/106; 349/155
(58) Field of Classification Search ............ 349/106
See application file for complete search history.

(56) References Cited

U.S. PATENT DOCUMENTS

| 7,209,198 | B2 | 4/2007 | Park | |
|---|---|---|---|---|
| 7,212,262 | B2 | 5/2007 | Kang | |
| 2005/0140858 | A1* | 6/2005 | Park | 349/110 |
| 2006/0139515 | A1* | 6/2006 | Baek | 349/106 |
| 2006/0208293 | A1 | 9/2006 | Lim | |
| 2008/0063954 | A1 | 3/2008 | Song | |

FOREIGN PATENT DOCUMENTS

| JP | 11295717 | 10/1999 |
|---|---|---|
| JP | 2005182067 | 7/2005 |
| JP | 2007033744 | 2/2007 |
| KR | 1020050064370 | 6/2005 |
| KR | 1020050070256 | 7/2005 |
| KR | 1020060101084 | 9/2006 |
| KR | 100663030 | 12/2006 |
| KR | 1020070037114 | 4/2007 |
| KR | 100825105 | 4/2008 |

* cited by examiner

*Primary Examiner* — Uyen Chau N Le
*Assistant Examiner* — Chris Chu
(74) *Attorney, Agent, or Firm* — H.C. Park & Associates, PLC

(57) ABSTRACT

A liquid crystal display according to an exemplary embodiment of the present invention includes: a substrate; a red color filter, a green color filter, and a blue color filter arranged on the substrate and respectively including a red pigment, a green pigment, and a blue pigment; and a transparent color filter including a passivation layer including at least one of the red pigment, the green pigment, and the blue pigment, and the passivation layer is simultaneously formed with a spacer, the spacer including the same material as the passivation layer.

28 Claims, 4 Drawing Sheets

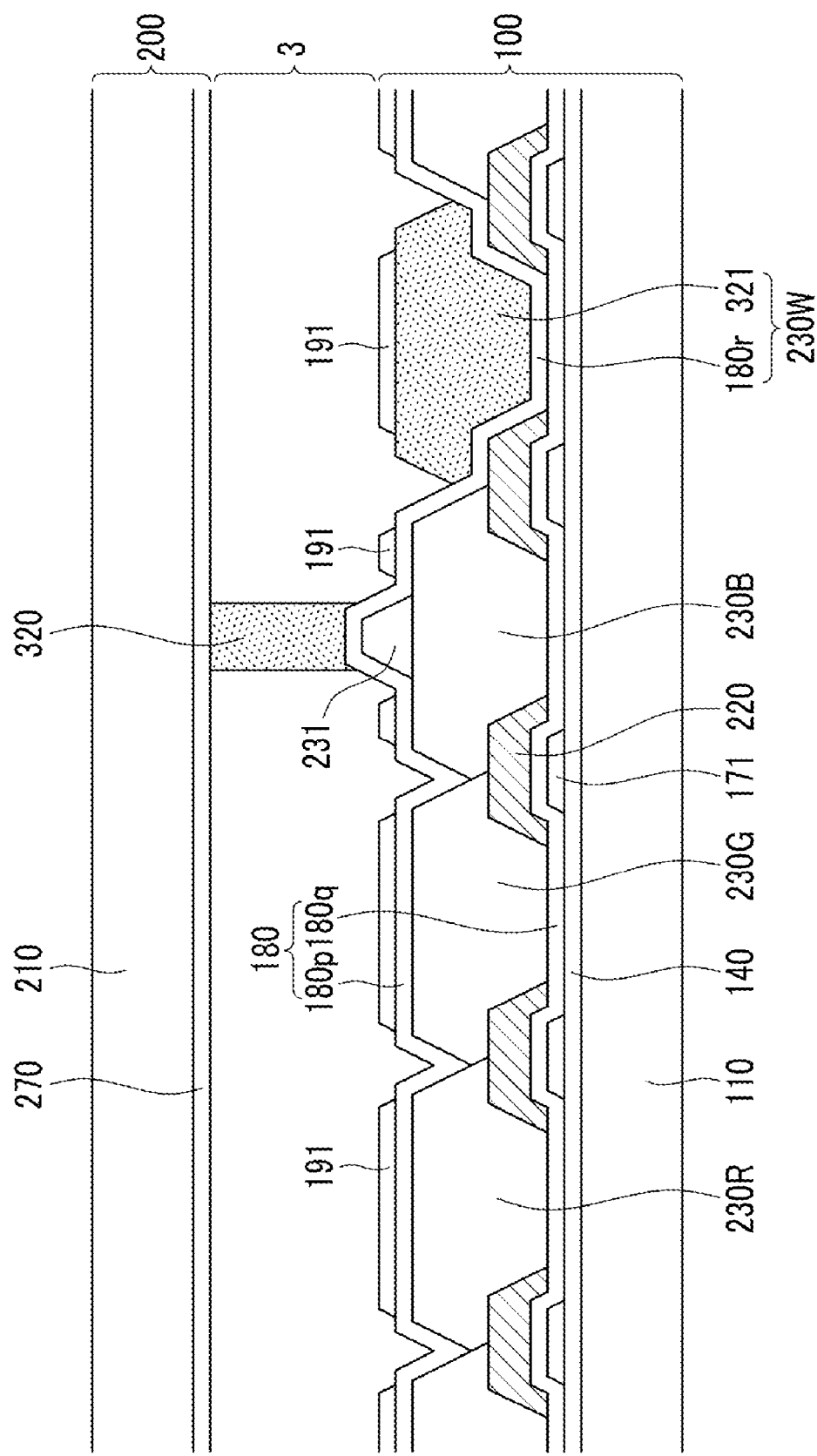

LIQUID CRYSTAL DISPLAY AND MANUFACTURING METHOD THEREOF

CROSS REFERENCE TO RELATED APPLICATION

This application claims priority from and the benefit of Korean Patent Application No. 10-2008-0097653, filed on Oct. 6, 2008, which is hereby incorporated by reference for all purposes as if fully set forth herein.

BACKGROUND OF THE INVENTION

1. Field of the Invention

The present disclosure relates to a liquid crystal display and a manufacturing method thereof.

2. Discussion of the Background

A liquid crystal display (LCD) is one type of widely used flat panel display. The LCD includes two display panels in which field generating electrodes such as pixel electrodes and a common electrode are formed, and a liquid crystal layer is disposed between the display panels. In the LCD, a voltage is applied to the field generating electrodes to generate an electric field in the liquid crystal layer, which determines an alignment direction of liquid crystal molecules of the liquid crystal layer, and an image is displayed by controlling the polarization of incident light passing through the liquid crystal layer.

A color filter used in the LCD typically displays one of three colors of red, green, and blue. However, a transparent color filter that permits white light to directly pass through has been developed, and may improve the luminance of the white color light emitted from the LCD.

SUMMARY OF THE INVENTION

An exemplary embodiment of the present invention provides an LCD that includes a second passivation layer including color filters, so that the LCD may have reduced luminance deviation and color coordinate deterioration.

Another exemplary embodiment of the present invention also provides a manufacturing method of the liquid crystal display including simultaneously forming a spacer and second passivation layer that may simplify the manufacturing process of the liquid crystal display.

Additional features of the invention will be set forth in the description which follows, and in part will be apparent from the description, or may be learned by practice of the invention.

Another exemplary embodiment of the present invention discloses a liquid crystal display including: a substrate; a red color filter, a green color filter, and a blue color filter arranged on the substrate and respectively comprising red pigments, green pigments, and blue pigments; a first passivation layer arranged on the red color filter, the green color filter, and the blue color filter; a transparent color filter including the first passivation layer and a second passivation layer, wherein the second passivation layer is arranged on the first passivation layer, and the second passivation layer includes at least one of the red pigments, the green pigments, and the blue pigments; and a spacer including the same material as the second passivation layer.

The ratio of the pigments in the spacer and the second passivation layer may be substantially the same as the ratio of the pigments in the red color filter, the green color filter, and the blue color filter. The mass of the pigments in the spacer and the second passivation layer may be in the range of about 5% -25% of the total mass of the pigments in the red color filter, the green color filter, and the blue color filter. The mass of the pigments in the red color filter, the green color filter, and the blue color filter may be respectively about 20-35 parts by weight about 20-40 parts by weight and about 12-30 parts by weight. The weight ratio of the red, green, and blue pigments in the spacer and the second passivation layer may be respectively about 30:35:25, 27:31:21, and 25:26:17 for color reproducibility of about 72%, 65%, and 45%. A protrusion member may be disposed on at least one of the red color filter, the green color filter, and the blue color filter, and the spacer is disposed on the protrusion member. The protrusion member may comprise the same material as at least one of the red color filter, the green color filter, and the blue color filter. The thickness of the spacer may be substantially the same as a cell gap. The thickness of the second passivation layer may be substantially the same as the thickness of the red color filter, the green color filter, and the blue color filter. The red color filter, the green color filter, the blue color filter, and the transparent color filter may be sequentially repeated. The liquid crystal display may further comprise a light blocking member disposed on the substrate.

Another exemplary embodiment of the present invention discloses a liquid crystal display including: a first display panel including a first substrate, signal lines arranged on the first substrate, and a thin film transistor connected to the signal lines; a red color filter, a green color filter, and a blue color filter arranged on the signal lines and the thin film transistor, and the red color filter, the green color filter, and the blue color filter respectively including red pigments, green pigments, and blue pigments, a first passivation layer arranged on the red color filter, the green color filter, and the blue color filter, a transparent color filter including the first passivation layer and a second passivation layer, wherein the second passivation layer is arranged on the first passivation layer and includes at least one of the red pigments, the green pigments, and the blue pigments, a spacer including the same material as the second passivation layer, and a pixel electrode arranged on the first passivation layer and the second passivation layer; a second display panel including a second substrate and a common electrode arranged on the second substrate; and a liquid crystal layer disposed between the first display panel and the second display panel.

Another exemplary embodiment of the present invention also discloses a manufacturing method of a liquid crystal display, the method including: forming a signal line on a first substrate; forming a red color filter, a green color filter, and a blue color filter on the signal line, the red color filter, the green color filter, and the blue color filter respectively comprising red pigments, green pigments, and blue pigments; forming a first passivation layer on the red color filter, the green color filter, and the blue color filter; simultaneously forming a spacer and a second passivation layer on the first passivation layer, the spacer and the second passivation layer each including at least one of the red pigments, the green pigments, and the blue pigments; and forming a pixel electrode on the first passivation layer and the second passivation layer.

The pigments in the spacer and the second passivation layer may be mixed with the same ratio as the ratio of the pigments of the red color filter, the green color filter, and the blue color filter. The pigments in the spacer and the second passivation layer may be mixed to have a mass in the range of about 5%-25% of the total mass of the pigment in the red color filter, the green color filter, and the blue color filter. A protrusion member may be simultaneously formed with at least one of the red color filter, the green color filter, and the blue color filter to be overlapped with at least one of the color filters in the step of forming of the red color filter, the green color filter, and the blue color filter. A step of forming a light blocking member on the signal line may be further comprised.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 is a cross-sectional view of a liquid crystal display according to another exemplary embodiment of the present invention.

DETAILED DESCRIPTION OF THE ILLUSTRATED EMBODIMENTS

Figure 1:
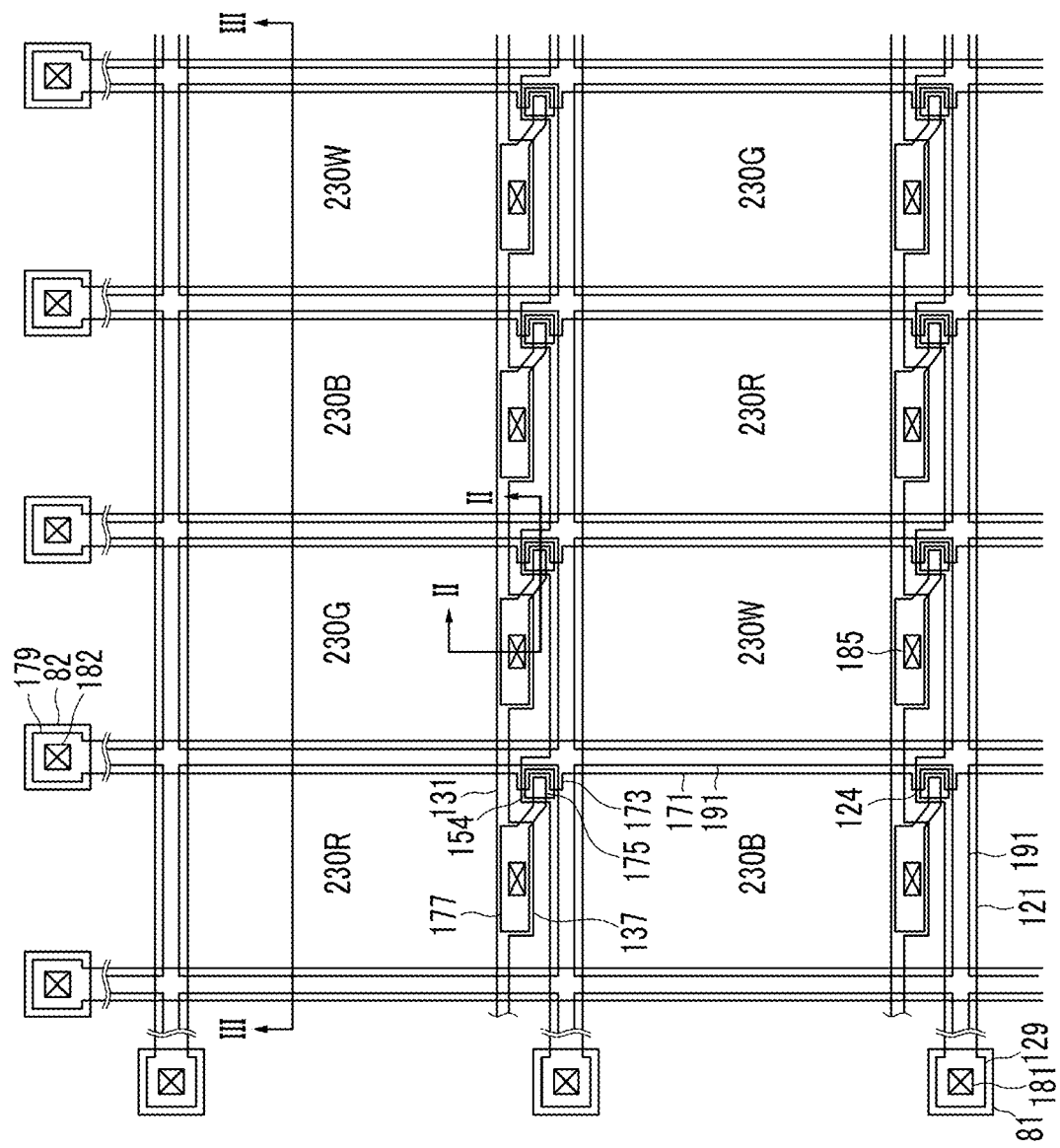
FIG. 1 is a layout view of a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A (thin film transistor) TFT array panel and an LCD comprising the same according to an exemplary embodiment of the present invention will be described with reference to FIG. 1, FIG. 2, FIG. 3, and FIG. 4.

Figure 2:
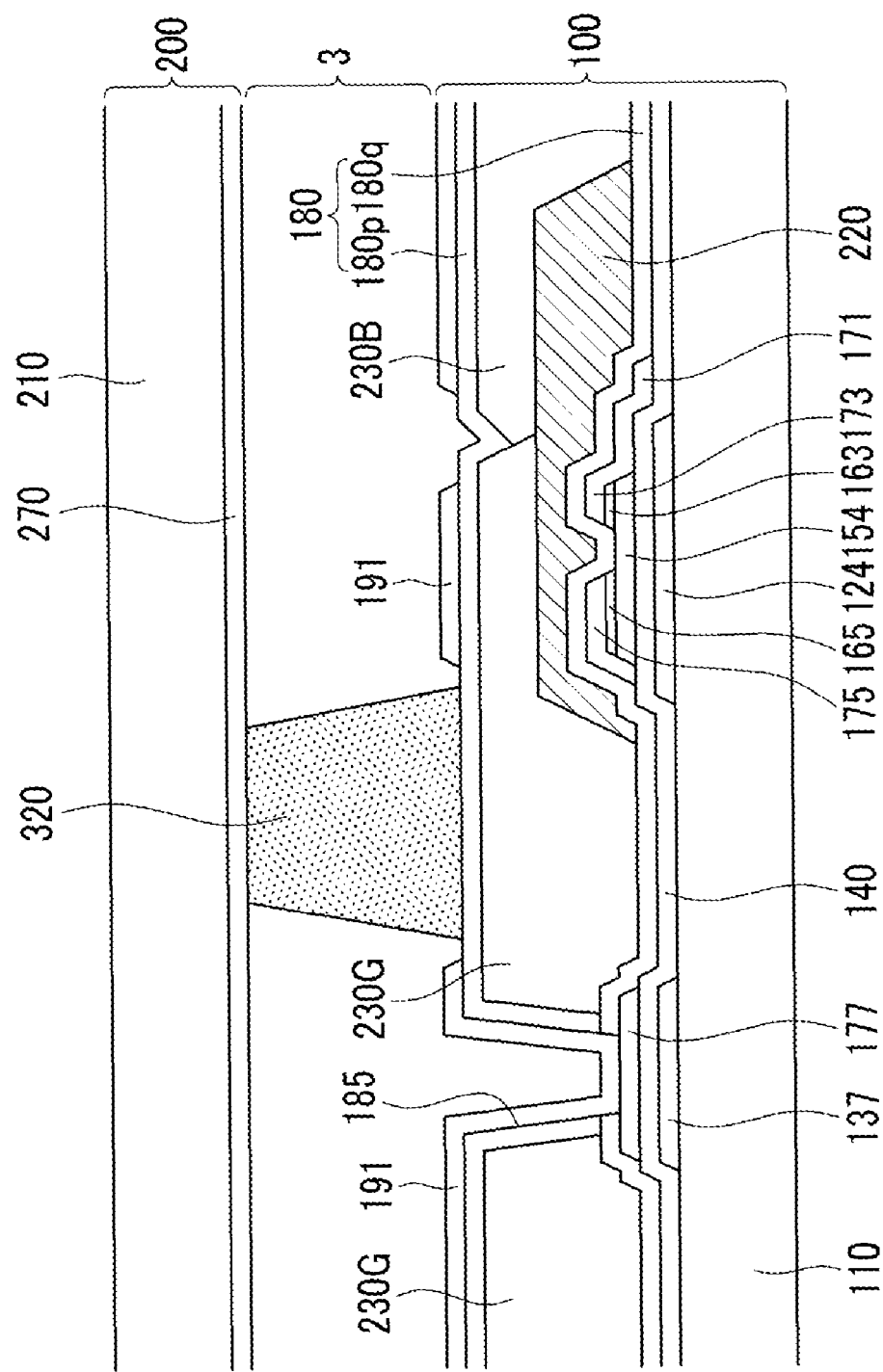
FIG. 2 is a cross-sectional view of the liquid crystal display shown in FIG. 1 taken along line II-II.
Figure 3:
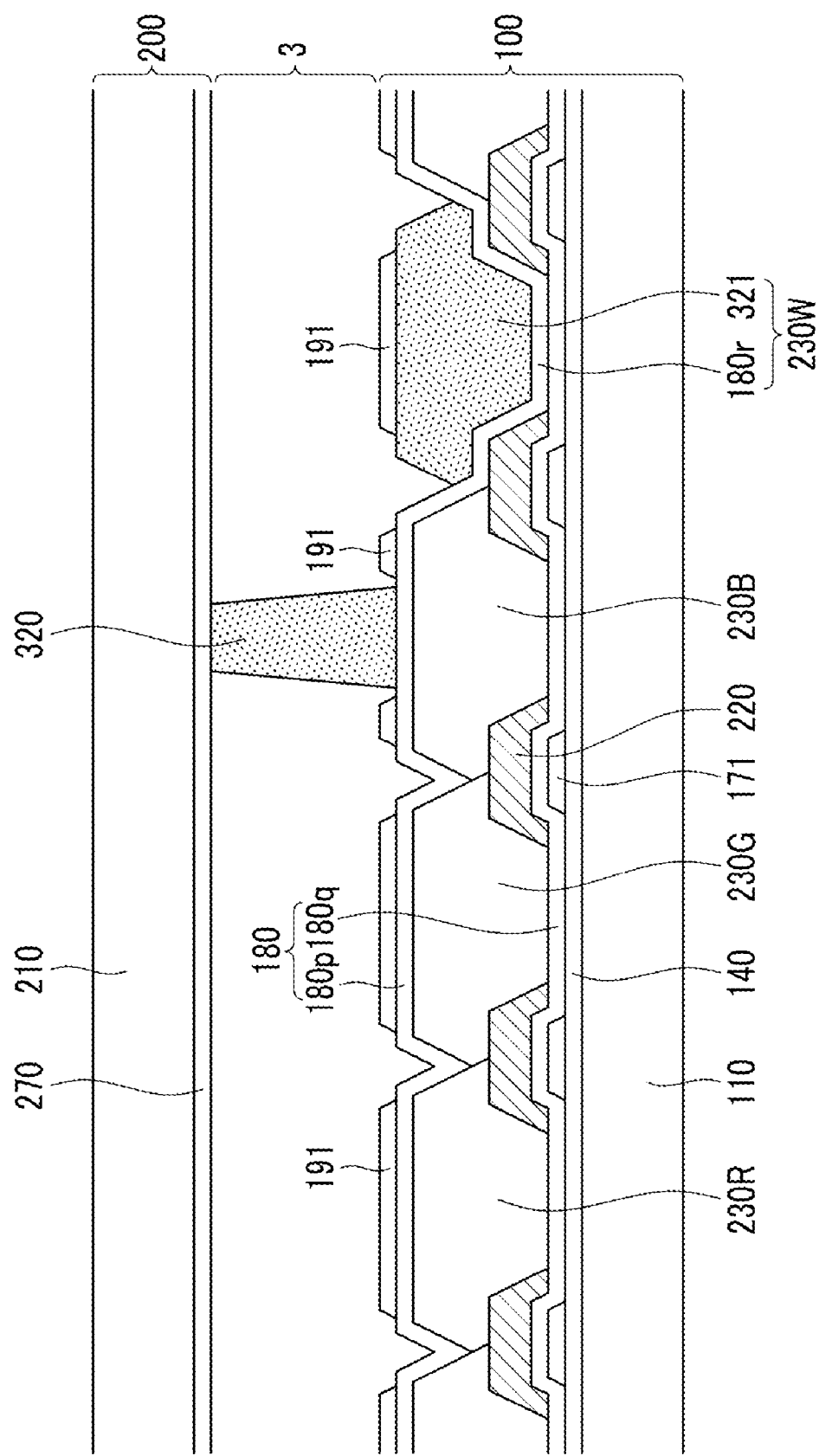
FIG. 3 is a cross-sectional view of the liquid crystal display shown in FIG. 1 taken along line III-III.

FIG. 1 is a layout view of a liquid crystal display according to an exemplary embodiment of the present invention, FIG. 2 is a cross-sectional view of the liquid crystal display shown in FIG. 1 taken along line II-II, and FIG. 3 is a cross-sectional view of the liquid crystal display shown in FIG. 1 taken along line III-III.

Referring to FIG. 1, FIG. 2, and FIG. 3, a liquid crystal display according to an exemplary embodiment of the present invention includes a first display panel 100, a second display panel 200, and a liquid crystal layer 3.

The liquid crystal layer 3 has positive dielectric anisotropy. The liquid crystal molecules of the liquid crystal layer 3 are arranged so that a longitudinal axis of the liquid crystal molecules is parallel to the surfaces of the two panels when an electric field does not exist in the liquid crystal display.

Alignment layers (not shown) may be applied on inner surfaces of the first and second display panels 100 and 200, and may be horizontal alignment layers. At least one polarizer (not shown) may be attached on outside surfaces of the first and second display panels 100 and 200.

First, the first display panel 100 will be described.

A plurality of gate lines 121 and storage electrode lines 131 are formed on a first insulating substrate 110, which may include a material such as transparent glass or plastic.

The gate lines 121 transmit gate signals and extend in a transverse direction. Each gate line 121 includes a plurality of gate electrodes 124 protruding upward, and an end portion 129.

The storage electrode lines 131 receive a predetermined voltage and are substantially parallel to the gate lines 121. Each storage electrode line 131 is disposed close to the gate line 121. Each storage electrode line 131 includes a plurality of primary storage electrodes 137 of an approximately square shape and a secondary storage electrode (not shown). However, the shape and arrangement of the storage electrode lines 131 may be variously changed.

A gate insulating layer 140, which may include silicon nitride (SiNx) or silicon dioxide (SiOx), is formed on the gate lines 121 and the storage electrode lines 131.

A semiconductor island 154, which may include hydrogenated amorphous silicon (simply referred to as a-Si) or crystallized silicon, is formed on the gate insulating layer 140. The semiconductor island 154 is disposed on the gate electrode 124.

A pair of ohmic contact islands 163 and 165 are formed on the semiconductor island 154. The ohmic contacts 163 and 165 may include n+ hydrogenated a-Si heavily doped with an N-type impurity such as phosphorous, or they may comprise a silicide.

A plurality of data lines 171 and drain electrodes 175 are formed on the ohmic contacts 163 and 165 and the gate insulating layer 140.

The data lines 171 transmit data voltages and extend in a longitudinal direction, thereby crossing the gate lines 121. Each data line 171 is disposed parallel to the secondary storage electrode, and close to the gate electrode 124. Each data line 171 includes a plurality of source electrodes 173 with a "U" shape that is inclined toward the side on the gate electrode 124, and an end portion 179.

The drain electrode 175 is separated from the data line 171, and includes a narrow portion and a wide portion 177. The narrow portion includes an end portion enclosed by the source electrode 173, and the wide portion 177 has an approximately square shape and overlaps the primary storage electrode 137. The wide portion 177 of the drain electrode 175 may be smaller than the area of the primary storage electrode 137.

A gate electrode 124, a source electrode 173, and a drain electrode 175 form a TFT along with a semiconductor island 154, and the channel of the thin film transistor is formed in the semiconductor island 154 between the source electrode 173 and the drain electrode 175.

The ohmic contact islands 163 and 165 are disposed between the underlying semiconductor islands 154 and the overlying data lines 171 and drain electrodes 175 thereon, and reduce contact resistance therebetween. The semiconductor island 154 includes exposed portions that are not covered by the source electrodes 173 and the drain electrodes 175, and portions that are disposed between the data lines 171 and the drain electrodes 175.

A first passivation layer 180 is formed on the data line 171, the drain electrode 175, and the exposed semiconductor island 154. The first passivation layer 180 includes a lower layer 180*q* and an upper layer 180*p*/180*r*. The lower layer 180*q* and the upper layer 180*p*/180*r* repectively may comprise an organic insulator or an inorganic insulator such as silicon nitride or silicon oxide. At least one of the lower layer 180*q* and the upper layer 180*p*/180*r* may be omitted. The passivation layer 180 has a contact hole 185 exposing the wide portion 177 of the drain electrode 175.

A light blocking member (black matrix) 220 is formed between the upper layer 180*p*/180*r* and the lower layer 180*q*. The light blocking member 220 prevents light from being transmitted through the region where the liquid crystal molecules of the liquid crystal layer 3 are not controlled, or external light from being reflected. The light blocking member 220 is formed in the first display panel 100, not the second display panel 200, and the transmittance of the liquid crystal display may be improved and the manufacturing process may be simplified. Alternatively, the light blocking member 220 may be formed in the second display panel 200.

A red color filter 230R, a green color filter 230G, and a blue color filter 230B are disposed between the upper layer 180*p*/180*r* and the lower layer 180*q*. The red color filter 230R occupies substantially the region between adjacent data lines 171. The left and right boundaries of the red color filter 230R are disposed on the data lines 171 and may extend according to the data lines 171 in the longitudinal direction. In this case, the red color filter 230R may have a stripe shape. The red color filter 230R has the contact hole 185 disposed on the wide portion 177 of the drain electrode 175. The red color filter 230R may comprise a photosensitive organic material comprising red pigments. Alternatively, the red color filter 230R may be disposed on the second display panel 200 rather than the first display panel 100. The above description of the red color filter 230R may be similarly applied to the green color filter 230G and the blue color filter 230B.

The color filters 230R, 230G, and 230B may include materials such as pigments, a binder, a monomer, and a photoinitiator. In the case of a television, the red pigment in the red color filter 230R is present at about 30 weight percentage (wt %), the green pigment in the green color filter 230G is present at about 35 wt %, and the blue pigment in the blue color filter 230B is present at about 25 wt %. In the case of a monitor, the red pigment, the green pigment, and the blue pigment are respectively present at about 27 wt %, about 31 wt %, and about 21 wt %, and in the case of a laptop screen, the red pigment, the green pigment, and the blue pigment are respectively present at about 25 wt %, about 26 wt %, and about 17 wt %. Each wt % of the pigments refers to the total weight of solid materials in each of the color filters 230R, 230G and 230B.

A pixel electrode 191 and connecting members 81 and 82 are formed on the upper layer 180*p*/180*r* of the passivation layer 180. The pixel electrodes 191 and connecting members 81 and 82 may comprise a transparent conductive material such as indium tin oxide (ITO) or indium zinc oxide (IZO). The connecting member 81 is connected to the end portion 129 of the gate line 121 through a contact hole 181. The connecting member 82 is connected to the end portion 179 of the data line 171 through a contact hole 182.

The pixel electrodes 191 are connected to the drain electrodes 175 of the thin film transistors through the contact holes 185, and are applied with data voltages from the drain electrodes 175. The pixel electrodes 191 supplied with the data voltages generate an electric field along with the common electrode 270 of the second display panel 200, which determines the orientation of the liquid crystal molecules of the liquid crystal layer 3 disposed between the electrodes 191 and 270. Accordingly, the luminance of the light transmitted through the liquid crystal layer 3 varies depending on the orientation of the liquid crystal molecules.

A pixel electrode 191 and the common electrode 270 form a liquid crystal capacitor that maintains the voltage applied to the pixel electrode 191 after the thin film transistor is turned off.

The pixel electrode 191 and the drain electrode 175 connected thereto, and the storage electrode line 131 comprising the primary storage electrode 137 and the secondary storage electrode, are overlapped with each other to thereby form a storage capacitor.

Spacers 320 that are made of an organic material are disposed in the display area of the LCD. The spacers 320 maintain the interval of the liquid crystal layer 3.

A second passivation layer 321 is formed on the upper layer 180*r*, and the upper layer 180*r* and the second passivation layer 321 include a transparent color filter 230W. The upper layer 180*r* is the same as the upper layer 180*p*, but the upper layer 180*r* is only formed under the second passivation layer 321. Here, the second passivation layer 321 is formed in the same step as the spacer 320. Accordingly, it is not necessary to add a mask for forming the second passivation layer 321 so that the manufacturing process of the LCD may be simplified.

A half-tone mask is used for forming the spacer 320 and the second passivation layer 321, and the photosensitive material may comprise a positive or a negative photo material. When the positive photo material or the negative photo material is a liquid, it is coated on the upper layer 180*p*/180*r* by using spin coating, and when it is a dry film, it is attached to the upper layer 180*p*/180*r* by using a laminator.

The half-tone mask includes a transmitting region where all the light is transmitted, a light blocking region where all the light is blocked, and a translucent region where a portion of the light is transmitted. The translucent region may include several slits that are closely disposed, or a thin metal layer to control the exposure amount. In this case, the number of slits, the width thereof, or the thickness of the metal layer may control the exposure amount.

For example, when forming the second passivation layer 321 and the spacer 320 by using the positive photosensitive material, a portion where the spacer 320 is formed may be disposed on the light blocking region, a portion where the second passivation layer 321 is formed may be disposed on the translucent region, and a portion where the positive photosensitive material is removed may be disposed on the transmitting region. Alternatively, when forming the second passivation layer 321 and the spacer 320 by using the negative photosensitive material, the portion where the spacer 320 is formed may be disposed on the transmitting region, the portion where the second passivation layer 321 is formed may be disposed on the translucent region, and the portion where the negative photosensitive material is removed may be disposed on the light blocking region.

The second passivation layer 321 and the spacer 320 include at least one of a red pigment, a green pigment, and a blue pigment. The ratio of the pigments in the passivation layer 321 and spacer 320, respectively, may be substantially the same as the ratio of the red pigment, the green pigment, and the blue pigment in the red color filter 230R, the green color filter 230G, and the blue color filter 230B. Here, the second passivation layer 321 and the spacer 320 include a small amount of pigments compared with the color filter, and may have a semi-transparent characteristic so that they are a little cloudy. Also, the mass of the entire pigment in the second passivation layer 321 and the spacer 320, respectively, may be about 5%-25% of the total mass of the pigments included in the red, green, and blue color filters.

For example, the ratio of the pigments in the red, green, and blue color filters is about 30:35:25 in the case of a television so that the second passivation layer 321 and the spacer 320 forming the television include the pigments of red, green, and blue at a ratio of 30:35:25, and the sum of the mass of the red, green, and blue pigments in the second passivation layer 321 and the spacer 320, respectively, may be about 10% of the total mass of the pigments included in the red, green, and blue color filters. Also, a monitor includes the pigments in a ratio of about 27:31:21, and a laptop screen includes the pigments in a ratio of about 25:26:17. Accordingly, the deviations for the luminance and the color coordinate values of the white light combined through the red color filter 230R, the green color filter 230G, and the blue color filter 230B, and the light transmitted through the transparent color filter 230W, may be reduced.

For example, the luminance and the color coordinate values are measured by using a multichannel spectrophotometer (MCPD-3000) and the luminance and color coordinate values are shown in Table 1 below.

TABLE 1

|  | Mass of pigments (parts by weight) | Luminance (sb) | Color coordinate values (x, y) |
| --- | --- | --- | --- |
| Comparative Example 1 | 100 | 27 | (0.320, 0.340) |
| Comparative Example 2 | 0 | 32 | (0.312, 0.329) |
| Exemplary Embodiment 1 | 5 | 30.4 | (0.319, 0.338) |
| Exemplary Embodiment 2 | 10 | 28.8 | (0.319, 0.338) |
| Exemplary Embodiment 3 | 15 | 27.2 | (0.319, 0.338) |
| Exemplary Embodiment 4 | 20 | 25.5 | (0.319, 0.338) |
| Exemplary Embodiment 5 | 25 | 23.9 | (0.319, 0.338) |

In Table 1, the mass of the pigments is a total mass including all red pigments, green pigments, and blue pigments.

In Comparative Example 1, the mass of the entire pigments in the red color filter 230R, the green color filter 230G, and the blue color filter 230B is 100 parts by weight, and the ratio of the red pigment, the green pigment, and the blue pigment is about 30:35:25. In Comparative Example 2, the pigments are not included in the spacer 320 and the second passivation layer 321.

In Exemplary Embodiment 1, the total mass of the pigments in the spacer 320 and the second passivation layer 321 is 5 parts by weight, and the ratio of the red pigments, the green pigments, and the blue pigments is about 30:35:25. Likewise, in Exemplary Embodiment 2 to Exemplary Embodiment 5, the total masses of the pigments in the spacer 320 and the second passivation layer 321 are respectively about 10 parts by weight, 15 parts by weight, 20 parts by weight, and 25 parts by weight, and the ratio of the red pigments, the green pigments, and the blue pigments is about 30:35:25.

In Table 1, when the luminance of an Exemplary Embodiment is close to the luminance of Comparative Example 1, the deviation of luminance may be reduced and control of the gamma balance may be easy. The luminance deviation is 5 in the case of Comparative Example 2, which does not include the pigments. However the luminance deviation of Exemplary Embodiment 3 is 0.2 so that the control of the gamma balance may be easy in the case of Exemplary Embodiment 3.

In Table 1, when the color coordinate values of an Exemplary Embodiment are close to the color coordinate values of Comparative Example 1, the deviation of the color coordinate values may be reduced and driving the LCD may be easy. In comparison with Comparative Example 2, the deviations of the color coordinate values between Comparative Example 1 and Exemplary Embodiments 1 to 5 are very small so that the driving of the LCD may be easy.

Next, the second display panel 200 will be described.

A common electrode 270 is formed on a second insulating substrate 210, which may be made of transparent glass or plastic. The common electrode 270 may be made of a transparent conductor such as ITO and IZO, and receives a common voltage.

An alignment layer (not shown) may be formed on the common electrode 270.

FIG. 4 is a cross-sectional view of an LCD according to another exemplary embodiment of the present invention. A protrusion member 231 is included on the display panel 100, and the thickness of the spacer 320 on the protrusion member 231 is almost the same as that of the second passivation layer 321, which is different from the exemplary embodiment shown in FIG. 3. In the exemplary embodiment shown in FIG. 4, the protrusion member 231 is formed when forming the red color filter 230R. After respectively forming the green color filter 230G and the blue color filter 230B, the protrusion member 231 is simultaneously formed on the position corresponding to the spacer 320 while forming the red color filter 230R. Therefore, a mask that does not have a translucent region may be used when forming the spacer 320 and the second passivation layer 321. Accordingly, when using the negative photosensitive material, the transmission region of the mask may be disposed on the spacer 320 and the second passivation layer 321 to form the spacer 320 and the second passivation layer 321 so that the thickness of the spacer 320 and the second passivation layer 321 are substantially the same. When the mask that does not include the translucent region is used, the process margin may be large under the exposure process or the developing process so that it may be easy to form the spacer 320 and the second passivation layer 321.

A manufacturing method of the LCD according to an exemplary embodiment of the present invention will now be described.

Firstly, a gate line 121 and a gate electrode 124 are formed on the first substrate 110. Here, after depositing the material for the gate line 121 on the first substrate 110, an exposure process is executed by using a mask comprising a transmission region and a light blocking region, and a developing process using an organic solvent is executed. Next, an etch process may be executed if necessary. Hereafter, the formation of the components described above may be executed with a similar method to the method described above.

Next, a gate insulating layer 140 is formed on the gate line 121 and the gate electrode 124. A semiconductor 154 is formed on the gate insulating layer 140. Ohmic contacts 163 and 165 are formed on the semiconductor 154. A data line 171, a source electrode 173, and a drain electrode 175 are formed on the ohmic contacts 163 and 165.

A lower layer 180q is formed on the source electrode 173 and the drain electrode 175. A light blocking member 220 is formed on the lower layer 180q. A red color filter 230R, a green color filter 230G, and a blue color filter 230B are formed on the light blocking member 220 and the lower layer 180q. In this case, a protrusion member 231 may be formed at a position where a spacer 320 will be formed when forming at least one of the color filters 230R, 230G, and 230B.

An upper layer (180p and 180r) is formed on the color filters 230R, 230G, and 230B. A spacer 320 and a second passivation layer 321 are simultaneously formed on the upper layer (180p and 180r). Here, the ratio of the material and the pigments for the spacer 320 and the second passivation layer 321 are the same as described above.

A pixel electrode 191 is formed on the upper layer 180p and the second passivation layer 321.

A liquid crystal layer 3 is formed on the pixel electrode 191.

A common electrode 270 is formed on a second substrate 210.

Next, the second substrate 210 is aligned so that the common electrode 270 of the second substrate 210 contacts the liquid crystal layer 3, and the first substrate 110 and the second substrate 210 are assembled.

Alternatively, the liquid crystal layer 3 may be formed on the common electrode 270 of the second substrate 210. In this case, the first substrate 110 may be aligned so that the pixel electrode 191 of the first substrate 110 contacts the liquid crystal layer 3, and the first substrate 110 and the second substrate 210 are combined.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a substrate;
   a red color filter, a green color filter, and a blue color filter disposed on the substrate and respectively comprising red pigments, green pigments, and blue pigments;
   a first passivation layer disposed on the red color filter, the green color filter, and the blue color filter;
   a transparent color filter comprising the first passivation layer and a second passivation layer, wherein the second passivation layer is disposed on the first passivation layer and the second passivation layer comprises at least one of the red pigments, the green pigments, and the blue pigments;
   a spacer comprising the same material and having substantially the same thickness as the second passivation layer; and
   a protrusion member disposed on at least one of the red color filter, the green color filter, and the blue color filter, wherein the spacer is disposed on the protrusion member,
   wherein the protrusion member comprises the same material as at least one of the red color filter, the green color filter, and the blue color filter, and
   wherein the protrusion member has a different color from one of the red, green, and blue color filters overlapping the protrusion member.

2. The liquid crystal display of claim 1, wherein
   the ratio of the pigments in the spacer and the second passivation layer is substantially the same as the ratio of the pigments in the red color filter, the green color filter, and the blue color filter.

3. The liquid crystal display of claim 2, wherein
   the mass of the pigments in the spacer and the second passivation layer is in the range of about 5%-25% of the total mass of the pigments in the red color filter, the green color filter, and the blue color filter.

4. The liquid crystal display of claim 2, wherein
   the mass of the pigments in the red color filter, the green color filter, and the blue color filter is respectively about 20-35 parts by weight, about 20-40 parts by weight and about 12-30 parts by weight.

5. The liquid crystal display of claim 1, wherein
   the protrusion member comprises the same material as at least one of the red color filter, the green color filter, and the blue color filter.

6. The liquid crystal display of claim 1, wherein
   the thickness of the spacer is substantially the same as the thickness of a cell gap.

7. The liquid crystal display of claim 1, wherein
   the thickness of the second passivation layer is the same as the thickness of each of the red color filter, the green color filter, and the blue color filter.

8. The liquid crystal display of claim 7, wherein
   the red color filter, the green color filter, the blue color filter, and the transparent color filter are sequentially repeated.

9. The liquid crystal display of claim 7, further comprising a light blocking member disposed on the substrate.

10. A liquid crystal display, comprising:
    a first display panel;
    a second display panel comprising a second substrate and a common electrode disposed on the second substrate; and
    a liquid crystal layer disposed between the first display panel and the second display panel,
    wherein the first display panel comprises:
       a first substrate, signal lines disposed on the first substrate, and a thin film transistor connected to the signal lines;
       a red color filter, a green color filter, and a blue color filter disposed on the signal lines and the thin film transistor, the red color filter, the green color filter, and the blue color filter respectively comprising red pigments, green pigments, and blue pigments;
       a first passivation layer disposed on the red color filter, the green color filter, and the blue color filter;
       a transparent color filter comprising the first passivation layer and a second passivation layer, wherein the second passivation layer is disposed on the first passivation layer and comprises at least one of the red pigments, the green pigments, and the blue pigments;
       a spacer comprising the same material and having the same thickness as the second passivation layer;
       a protrusion member disposed on at least one of the red color filter, the green color filter, and the blue color filter, wherein the spacer is disposed on the protrusion member; and
       a pixel electrode disposed on the first passivation layer and the second passivation layer,
       wherein the protrusion member comprises the same material as at least one of the red color filter, the green color filter, and the blue color filter, and
       wherein the protrusion member has a different color from one of the red, green, and blue color filters overlapping the protrusion member.

11. The liquid crystal display of claim 10, wherein
    the ratio of the pigments in the spacer and the second passivation layer is substantially the same as the ratio of the pigments of the red color filter, the green color filter, and the blue color filter.

12. The liquid crystal display of claim 11, wherein
    the mass of the pigments in the spacer and the second passivation layer is in the range of about 5%-25% of the total mass of the pigments in the red color filter, the green color filter, and the blue color filter.

13. The liquid crystal display of claim 11, wherein
the mass of the pigments in the red color filter, the green color filter, and the blue color filter is respectively about 20-35 parts by weight, about 20-40 parts by weight, and about 12-30 parts by weight.

14. The liquid crystal display of claim 13, wherein
the weight ratio of the red pigments, the green pigments, and the blue pigments in the spacer and the second passivation layer is about 30:35:25.

15. The liquid crystal display of claim 10, wherein
the thickness of the second passivation layer is substantially the same as the thickness of the red color filter, the green color filter, and the blue color filter.

16. The liquid crystal display of claim 15, wherein
the red color filter, the green color filter, the blue color filter, and the transparent color filter are sequentially repeated.

17. The liquid crystal display of claim 15, further comprising
a light blocking member disposed on the substrate.

18. A method for manufacturing a liquid crystal display, the method comprising:
forming a signal line on a first substrate;
forming a red color filter, a green color filter, and a blue color filter on the signal line, the red color filter, the green color filter, and the blue color filter respectively comprising red pigments, green pigments, and blue pigments;
forming a first passivation layer on the red color filter, the green color filter, and the blue color filter;
simultaneously forming a spacer and a second passivation layer on the first passivation layer, the spacer and the second passivation layer each having substantially the same thickness and each comprising at least one of the red pigments, the green pigments, and the blue pigments;
forming a protrusion member on at least one of the red color filter, the green color filter, and the blue color filter, wherein the spacer is disposed on the protrusion member; and
forming a pixel electrode on the first passivation layer and the second passivation layer,
wherein the protrusion member comprises the same material as at least one of the red color filter, the green color filter, and the blue color filter, and
wherein the protrusion member has a different color from one of the red, green, and blue color filters overlapping the protrusion member.

19. The method of claim 18, wherein
the pigments in the spacer and the second passivation layer are mixed to have substantially the same ratio as the ratio of the pigments of the red color filter, the green color filter, and the blue color filter.

20. The method of claim 19, wherein
the pigments in the spacer and the second passivation layer are mixed with a mass in the range of about 5%-25% of the total mass of the pigments in the red color filter, the green color filter, and the blue color filter.

21. The method of claim 19, wherein
the mass of the pigments in the red color filter, the green color filter, and the blue color filter are respectively about 20-35 parts by weight, about 20-40 parts by weight, and about 12-30 parts by weight.

22. The method of claim 21, wherein
the weight ratio of the red pigments, the green pigments, and the blue pigments in the spacer and the second passivation layer is about 30:35:25.

23. The method of claim 21, wherein
the weight ratio of the red pigments, the green pigments, and the blue pigments in the spacer and the second passivation layer is about 27:31:21.

24. The method of claim 21, wherein
the weight ratio of the red pigments, the green pigments, and the blue pigments in the spacer and the second passivation layer is about 25:26:17.

25. The method of claim 18, wherein
a protrusion member is simultaneously formed with at least one of the red color filter, the green color filter, and the blue color filter, the protrusion member being overlapped with at least one of the color filters in the step of forming of the red color filter, the green color filter, and the blue color filter.

26. The method of claim 18, wherein
the thickness of the second passivation layer is substantially the same as the thickness of the red color filter, the green color filter, and the blue color filter.

27. The method of claim 26, wherein
the red color filter, the green color filter, the blue color filter, and the transparent color filter are sequentially repeated.

28. The method of claim 26, further comprising
forming a light blocking member on the signal line.

* * * * *